United States Patent
Downing et al.

(10) Patent No.: US 10,436,881 B2
(45) Date of Patent: Oct. 8, 2019

(54) PHOTONICS DEVICE

(71) Applicant: STMICROELECTRONICS (RESEARCH & DEVELOPMENT) LIMITED, Marlow Bucks (GB)

(72) Inventors: James Peter Drummond Downing, Doune (GB); Adam Caley, Fife (GB)

(73) Assignee: STMICROELECTRONICS (RESEARCH & DEVELOPMENT) LIMITED, Marlow Bucks (GB)

( * ) Notice: Subject to any disclaimer, the term of this patent is extended or adjusted under 35 U.S.C. 154(b) by 850 days.

(21) Appl. No.: 15/055,860

(22) Filed: Feb. 29, 2016

(65) Prior Publication Data

US 2017/0003379 A1 Jan. 5, 2017

(30) Foreign Application Priority Data

Jul. 1, 2015 (GB) .................................. 1511551.2

(51) Int. Cl.
| | |
|---|---|
| *G01C 3/08* | (2006.01) |
| *G01S 7/484* | (2006.01) |
| *G01S 7/486* | (2006.01) |
| *G01S 17/10* | (2006.01) |
| *G01S 17/36* | (2006.01) |
| *G01S 7/481* | (2006.01) |

(52) U.S. Cl.
CPC ............ *G01S 7/484* (2013.01); *G01S 7/4814* (2013.01); *G01S 7/4816* (2013.01); *G01S 7/4863* (2013.01); *G01S 17/10* (2013.01); *G01S 17/36* (2013.01)

(58) Field of Classification Search
CPC ...... G01S 7/484; G01S 7/4814; G01S 7/4816; G01S 7/4863; G01S 17/10; G01S 17/36
See application file for complete search history.

(56) References Cited

U.S. PATENT DOCUMENTS

| | | | |
|---|---|---|---|
| 2004/0125357 A1 | 7/2004 | Ohtomo et al. | |
| 2006/0077859 A1 | 4/2006 | Nishimoto et al. | |
| 2007/0181810 A1* | 8/2007 | Tan | ........................ G01S 7/4811 250/341.1 |
| 2013/0208256 A1 | 8/2013 | Mamidipudi et al. | |
| 2013/0278939 A1 | 10/2013 | Pfister et al. | |
| 2015/0124241 A1* | 5/2015 | Eisele | ...................... G01C 3/08 356/5.01 |

FOREIGN PATENT DOCUMENTS

| | | |
|---|---|---|
| CN | 1512136 A | 7/2004 |
| CN | 1779802 A | 5/2006 |
| EP | 0488416 A1 | 6/1992 |
| WO | 9415184 A1 | 7/1994 |

* cited by examiner

*Primary Examiner* — Samantha K Abraham
(74) *Attorney, Agent, or Firm* — Slater Matsil, LLP

(57) ABSTRACT

A method may include generating, within a device, separate and discrete wavelengths, and generating light intensity profiles based on an interaction between the separate and discrete wavelengths and a multi-wavelength diffractive optic element. The method may include detecting an object from light reflected from the object using the light intensity profiles. The light intensity profiles may include a shorter range light intensity profile and a longer range light intensity profile, each light intensity profile having different energy per solid angle patterns.

21 Claims, 7 Drawing Sheets

PHOTONICS DEVICE

RELATED APPLICATION

This application is based upon prior filed copending United Kingdom Application No. 1511551.2 filed Jul. 1, 2015, the entire subject matter of which is incorporated herein by reference in its entirety.

TECHNICAL FIELD

The present disclosure relates to a photonics device, and more particularly to a photonics ranging device and related methods.

BACKGROUND

Current photonics ranging devices may be limited to a single application for which they are optimized. For example, these applications can include single or multi-zone ranging systems. Furthermore, these single and multi-zone ranging systems can be divided into shorter range (e.g. 0-30 cm) and longer range (e.g. from 30 cm) detecting systems. Depending on the application, the output of the light source should be controlled in such a way as to satisfy this application. This may inherently make the device unsuitable for alternative applications.

For example, a photonics ranging device application may use time of flight (TOF) to determine a distance between a reflective object and the device. In TOF, a pulse of light is emitted and reflected off an object back to a sensor. The time taken for the light to travel to the object and be reflected back onto a sensor may be used to determine the distance between the object and the device based on the known speed of light.

The photonic device and the TOF calculations may be implemented in applications where it is useful to know the distance between an object and the device. One example is in mobile telephones incorporating touch screens. In this application, when receiving or making a phone call, part of a user's face may touch the touchscreen to place the ear in the vicinity of the speaker. During the call, the touchscreen should be non-responsive to the user's face to prevent accidental hanging up. Time of flight calculations may be carried out to determine that this is the case and to disable the touch screen. However, such a device may not be optimized or designed to be used in application where longer range detection is required. For example, one long range application is to use the photonic device in the same mobile telephone to determine an object's motion away from the mobile phone and thus enable gesture control of the mobile telephone.

SUMMARY

Generally speaking, a photonic device may include at least one light source configured to generate a plurality of separate and discrete wavelengths, and a multi-wavelength diffractive optic element. The multi-wavelength diffractive optic element may be configured to generate a plurality of light intensity profiles based on an interaction with the plurality of separate and discrete wavelengths, and detect an object from light reflected from the object using the plurality of light intensity profiles. The plurality of light intensity profiles may include a shorter range light intensity profile and a longer range light intensity profile, each light intensity profile having different energy per solid angle patterns.

DETAILED DESCRIPTION

Figure 1:
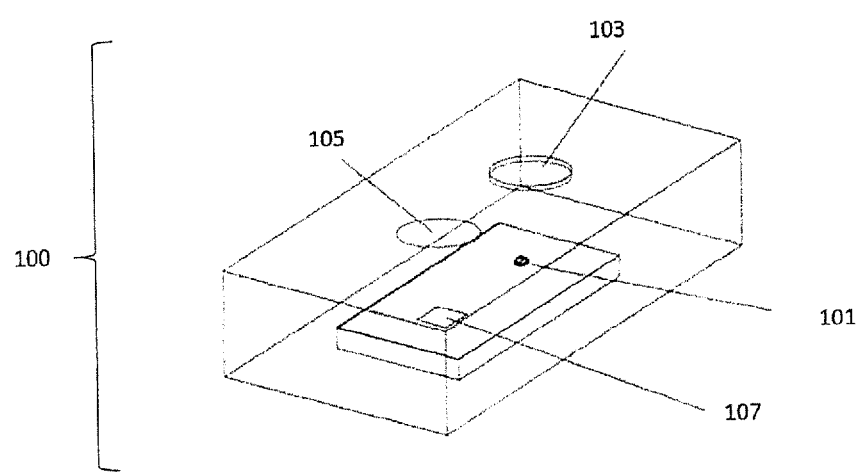
FIG. 1 is a schematic diagram of an example of a photonic device, according to the prior art.

According to a first aspect, a method may include generating, within a device at least two separate and discrete wavelengths, and generating at least two light intensity profiles based on an interaction between the at least two separate and discrete wavelengths and a multi-wavelength diffractive optic element, such that the at least two light intensity profiles can be used to detect an object from light reflected from the object. The at least two light intensity profiles may be spatially different.

The method may further comprise collecting reflected light, using a collector lens, the reflected light being from at least one of the at least two light intensity profiles reflected off the object. The method may further comprise detecting the collected reflected light using a return array. The return array may comprise a SPAD array.

In some embodiments, collecting reflected light, using a collector lens may comprise collecting reflected light using a multi-wavelength diffractive optic element to focus one of the at least two separate and discrete wavelengths on a first portion of the return array and another of the at least two separate and discrete wavelengths on a second portion of the return array. The first portion of the return array may be discrete from the second portion of the return array.

The method may further comprise filtering the collected reflected light such that the return array independently detects one of the at least two separate and discrete wavelengths from another of the at least two separate and discrete wavelengths. The method may further comprise determining a TOF estimate from the detected collected reflected light using the return array, and determining a distance between the device and the object based on the TOF estimate from the detected collected reflected light using the return array. The method may further comprise determining a phase difference between the detected collected reflected light using the return array and a reference signal, and determining a distance between the device and the object based on the phase difference.

Moreover, the generating within a device at least two separate and discrete wavelengths may comprise generating each of the at least two separate and discrete wavelengths using separate light emitting diodes. The generating within a device at least two separate and discrete wavelengths may comprise generating each of the at least two separate and discrete wavelengths using at least one laser diode. The generating of each of the at least two separate and discrete wavelengths using at least one laser diode may comprise generating each wavelength using a multi-wavelength vertical-cavity surface-emitting laser.

According to another aspect, a photonic device may include at least one light source configured to generate at least two separate and discrete wavelengths, and a multi-wavelength diffractive optic element. The multi-wavelength diffractive optic element may be configured to generate at least two separate light intensity profiles based on an interaction between the at least two separate and discrete wavelengths and the multi-wavelength diffractive optic element, such that the at least two light intensity profiles can be used to detect an object from light reflected from the object.

The at least two light intensity profiles may be spatially different. The photonic device may further comprise a collector lens configured to collect reflected light, the reflected light being from at least one of the at least two light intensity profiles reflected off the object. The photonic device may further comprise a return array configured to detect the collected reflected light. The return array may comprise a SPAD array.

The collector lens may be a multi-wavelength diffractive optic element configured to focus one of the at least two separate and discrete wavelengths on a first portion of the return array and another of the at least two separate and discrete wavelengths on a second portion of the return array. The first portion of the return array may be discrete from the second portion of the return array. The photonic device may further comprise a patterned filter array configured to filter the collected reflected light such that the return array is configured to independently detect one of the at least two separate and discrete wavelengths from another of the at least two separate and discrete wavelengths.

The photonic device may further comprise a processor configured to determine a TOF estimate from the detected collected reflected light using the return array, and the processor is further configured to determine a distance between the device and the object based on the TOF estimate from the detected collected reflected light using the return array. The photonic device may further comprise a processor configured to determine a phase difference between the detected collected reflected light using the return array and a reference signal, and the processor is further configured to determine a distance between the device and the object based on the phase difference.

The at least one light source may comprise at least two light emitting diodes, each of the at least two light emitting diodes configured to generate a respective separate and discrete wavelength. The at least one light source may comprise at least one laser diode, and the at least one laser diode is configured to generate the separate and discrete wavelengths. The at least one laser diode may be a multi-wavelength vertical-cavity surface-emitting laser.

According to yet another aspect, an apparatus comprises means or circuitry for generating, within a device at least two separate and discrete wavelengths, and means or circuitry for generating at least two light intensity profiles, such that the at least two light intensity profiles can be used to detect an object from light reflected from the object. The means for generating at least two light intensity profiles may comprise a multi-wavelength diffractive optic element, and wherein the at least two intensity profiles may be generated based on an interaction between the at least two separate and discrete wavelengths and the multi-wavelength diffractive optic element. The at least two light intensity profiles may be spatially different.

The apparatus may further comprise means or circuitry for collecting reflected light, the reflected light being from at least one of the at least two light intensity profiles reflected off the object.

The apparatus may further comprise means or circuitry for detecting the collected reflected light. The means for detecting the collected reflected light may be a return array. The return array may comprise a SPAD array. The means for collecting reflected light may comprise a multi-wavelength diffractive optic element to focus one of the at least two separate and discrete wavelengths on a first portion of the return array and another of the at least two separate and discrete wavelengths on a second portion of the return array.

The first portion of the return array may be discrete from the second portion of the return array. The apparatus may further comprise means or circuitry for filtering the collected reflected light such that the means for detecting the collected reflected light independently detects one of the at least two separate and discrete wavelengths from another of the at least two separate and discrete wavelengths. The apparatus may further comprise means or circuitry for determining a TOF estimate from the detected collected reflected light, and means for determining a distance between the device and the object based on the TOF estimate from the detected collected reflected light.

The apparatus may further comprise means or circuitry for determining a phase difference between the detected collected reflected light and a reference signal, and determining a distance between the device and the object based on the phase difference. The means for generating within a device at least two separate and discrete wavelengths may comprise separate light emitting diodes for generating each of the at least two separate and discrete wavelengths.

The means for generating within a device at least two separate and discrete wavelengths may comprise at least one laser diode for generating each of the at least two separate and discrete wavelengths. The at least one laser diode may comprise a multi-wavelength vertical-cavity surface-emitting laser for generating each wavelength. The concept as described herein in the embodiments addresses the limit of a single application for photonic devices by producing different illumination arrangements from a single, solid-state device.

Referring to FIG. 1, a prior art photonic device 100 is shown. In the following examples, the direction of the device is such that the object which interacts with the emitted light from the photonic device 100 is "above" the device. The direction "above" should be interpreted as being a relative position to the photonic device in the path of the emitted light. The photonic device 100 comprises a housing, which may be a solid state housing, within which the components described hereafter can be formed or located. For example, the photonic device 100 may comprise a coherent or semi-coherent light source 101. The coherent light source may be a laser diode (LD), for example, a vertical cavity surface emitting laser (VCSEL).

Furthermore, an example of a semi-coherent light source 101 may be a light emitting diode (LED). The light source may have a defined frequency or wavelength profile. The photonic device 100 may further comprise a diffractive optic element 103 located at the surface of the photonic device 100 and "above" the light source 101. The diffractive optic element 103 may be configured to enable the light from the light source 101 to be emitted from the photonic device 100.

Furthermore, the diffractive optic element 103 may be configured to interact with the light generated by the light source 101 to generate a defined optical profile (i.e. to define a solid angle within which light from the light source is emitted and outside of which light is not emitted).

The emitted light may then be reflected by an object located "above" the device. The reflected light may be directed downwards and back to the photonic device 100. The photonic device 100 may further comprise a collector lens 105 configured such that light reflected from the object and incident on the collector lens is focused onto a return array 107. The collector lens is a lens that is placed above the sensor array to direct light onto the sensor array that would otherwise miss the sensor.

The photonic device 100 may furthermore comprise a return array 107. The return array 107 may be any suitable optical sensor configured to generate an electronic signal on detecting reflected light. In some embodiments, the return array is a single photon avalanche diode (SPAD) array. The SPAD array may be used as a detector of the reflected light. In general, an array of SPADs may be provided as a sensor in order to detect a reflected light pulse. A photon may generate a carrier, for example, an electron or hole, in the diode through the photoelectric effect. The carrier may trigger an avalanche current in one of the SPADs in the SPAD array. The avalanche current may signal an event, namely that a photon of light has been detected. An example of a SPAD element comprises a photo diode, a p-type MOSFET and a NOT gate.

Figure 2:
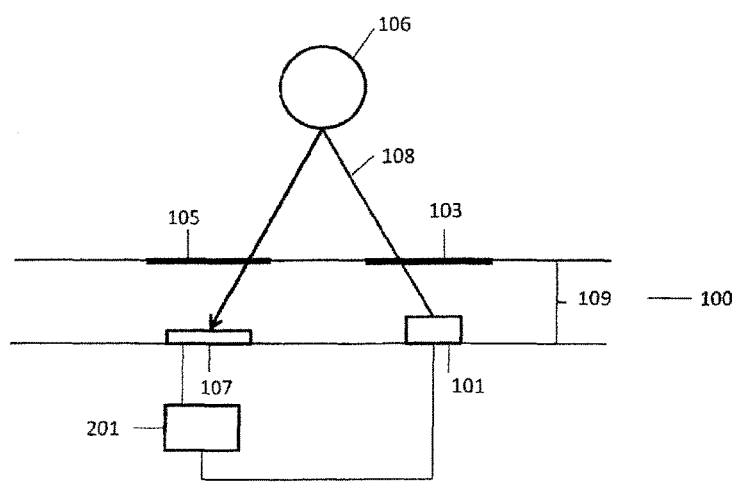
FIG. 2 is a schematic diagram of an example of the operation of the photonic device of FIG. 1.

The photonic device shown in FIG. 1 is thus configured to emit a fixed and constant in space illumination pattern defined by the diffractive optic element 103 characteristics and the single wavelength emitted by the light source 101. An example of the operation of the photonic device 100 such as shown in FIG. 1 is shown in further detail in FIG. 2. FIG. 2, for example, shows the light source 101 emitting light of a single wavelength (or substantially of a discrete and defined wavelength range), shown by the light ray 108. The light ray 108 is shown passing through the diffractive optic element 103 reflecting off an object 106, returning through the collector lens 105 and incident on the return array 107.

The return array 107 may be coupled to a processor 201, which is configured to receive the output of the return array 107. The processor 201 may be, for example, a time to distance converter configured to determine a distance between the object 106 and the photonic device 100 based on the time difference between the emitting and receiving of the light. The processor 201 may in some embodiments be configured to control or trigger a driver controlling the light source 101 to output the light.

The distance between a photonic device and an object may be calculated if a time that it takes light to travel between the device and the object is known. In TOF applications, a light emitter in a device may emit a pulse of light and a sensor of the device may detect the pulse after it has reflected off a remote object. The time at which the pulse of light was emitted and the time at which the reflected light was detected may be used to determine the time taken for the light pulse to travel to the remote object and back. Using the speed of light constant c, the distance between the remote object and the device comprising the emitter/sensor may be calculated.

A light emitter or light source 101 used for ToF may be driven by a driver. In order to emit a pulse of light, a trigger (signal) may be provided to the emitter driver from the controller processor 201 in order to trigger the pulse. In response to the trigger, the driver may turn on and then prepare to drive a pulsed output from the light source 101.

The direct TOP method uses a narrow pulsed laser, with a time-digital converter (TDC) measuring the difference in time between transmission and first photon reception. Commonly, a "reverse mode" is employed, where the TDC measures the back-portion of time, i.e. the time from first photon reception to next pulse transmission. This scheme minimizes system activity to only the occasions where a photon is detected, and is therefore well matched to tightly controlled, low photon flux levels and medical applications such as fluorescent lifetime microscopy (FLIM).

Furthermore, in some embodiments, the processor 201 may be configured to perform a phase extraction method. A phase extraction method for determining an object distance may be implemented as it is well suited to systems which implement computation of the generalized range equation using existing photodiode technology. The phase extraction method is also robust to background ambient light conditions, and may be adapted to allow for varying illuminator modulation wave-shapes (i.e. sinusoidal or square). The phase extraction method furthermore may be implemented where the return array is an array of SPADs in proximity detection applications. The phase extraction method may, for example, compare a detected signal against a reference signal. The reference signal may be a virtual or another controlled detected signal on a different sensor array.

As described previously, systems such as described above are designed and limited to a single application for which they are optimized. For example, these applications can include single or multi-zone ranging systems. Furthermore, these single and multi-zone ranging systems can be divided into short range (e.g. 0-30 cm) and long range (e.g. from 30 cm) detecting systems. Depending on the application, the output of the light source must be controlled in such a way as to satisfy this application. This inherently makes the device non-optimal for alternative applications.

For example, detecting part of a user's face near or touching the touchscreen of a phone when receiving or making a phone call. In such applications, the object detection is optimized for a single short range detection when a "face object" is close or touching the screen but rejects the situation when the user's finger touches the screen during a call.

Figure 3:
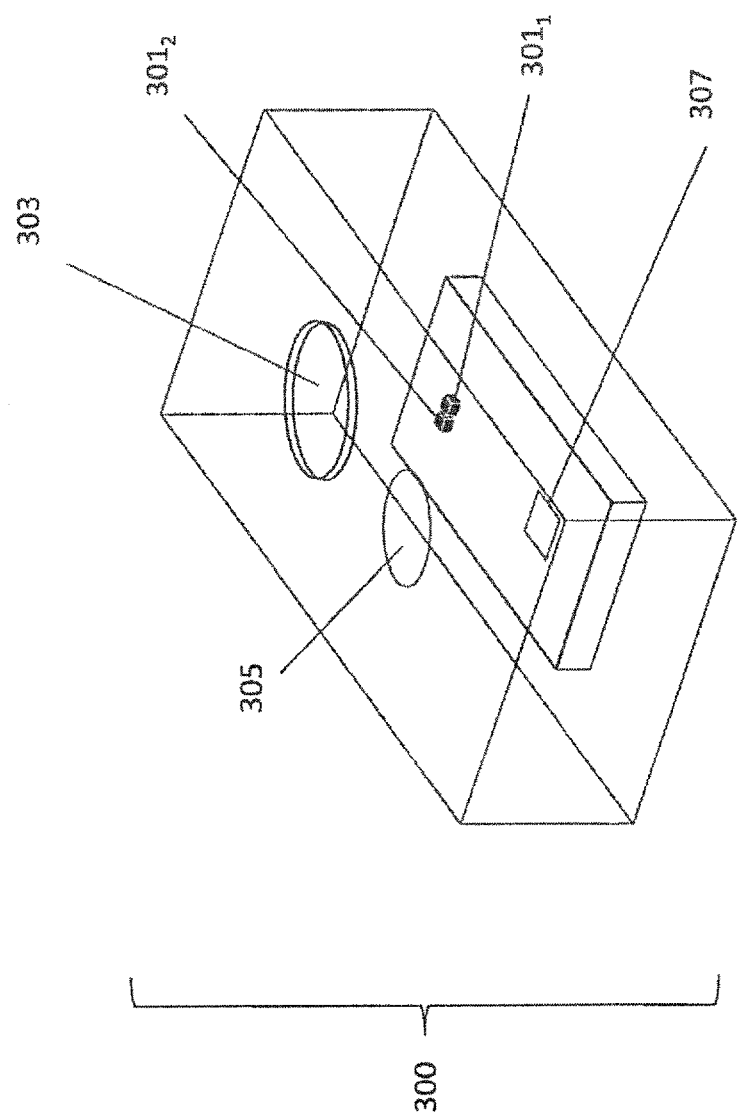
FIG. 3 is a schematic diagram of an example of a dual chromatic source photonic device, according to the present disclosure.

Referring to FIG. 3, an example embodiment of a solid state device to overcome such issues is described. In the example shown in FIG. 3, a dual chromatic source photonic device 300 is shown. The dual chromatic source photonic device 300 comprises a first light source 301$_1$ configured to generate a light source with a first emission wavelength $\lambda_1$. The device 300 further comprises a second light source 301$_2$ configured to generate a light with a second emission wavelength $\lambda_2$. The first light source emission wavelength $\lambda_1$ is discrete and different from the second emission wavelength $\lambda_2$. In the example shown herein, the first light source and the second light sources are separate LD or LED elements with discrete and different emission wavelengths. However, in some embodiments the solid state device may comprise a dual-wavelength LD or LED. For example, in some embodiments the dual-wavelength laser diode may be a Dual-Wavelength Vertical-Cavity Surface-Emitting Laser Array configured to generate a light source with a first emission wavelength $\lambda_1$ and with a second emission wavelength $\lambda_2$.

The dual chromatic source photonic device 300 further comprises a multi-wavelength diffractive optic element 303. The multi-wavelength diffractive optic element 303, located above the light sources, in some embodiments is configured to interact with the light wavelengths generated by the light sources $301_1$, $301_2$. In some embodiments, the multi-wavelength diffractive optic element 303 forms different light intensity profiles or patterns. For example, the multi-wavelength diffractive optic element (also called a MWDOE) 303 when illuminated by the two light sources (or the single light source configured to generate the two emission wavelengths) produces three intensity profiles (or energy per solid angle patterns). Each wavelength is operated on by the MWDOE so that the output intensity profile for each wavelength is arbitrary and individual from other wavelength intensity patterns. The available intensity patterns that the device can use are the intensity pattern associated with $\lambda_1$, given by $\phi(\lambda_1)$, the intensity pattern associated with $\lambda_2$, given by $\phi(\lambda_2)$ and the combination of both output intensities $\phi(\lambda_1)+\phi(\lambda_2)$.

In some embodiments, the MWDOE 303 forms common light intensity profiles or patterns. For example, the MWDOE 303, when illuminated by the two light sources (or the single light source configured to generate the two emission wavelengths), produces the same intensity illumination profile for both wavelengths. The available intensity patterns that the device can use are the intensity pattern associated with $\lambda_1$, given by $\phi(\lambda_2)$, the intensity pattern associated with $\lambda_2$, given by $\phi(\lambda_2)$ where $\phi(\lambda_1)=\phi(\lambda_2)$.

The design of such MWDOE components is known. For example, methods for designing such components may be found in Caley, A. J., A. J. Waddie, and M. R. Taghizadeh. "A novel algorithm for designing diffractive optical elements for two colour far-field pattern formation." Journal of Optics A: Pure and Applied Optics 7.6 (2005): S276.

As diffractive optics are wavelength dependent, the MWDOE may be designed such that it is configured to generate the same intensity profile for a broad range of emitter wavelengths. In other words, the MWDOE may be designed to generate a first intensity pattern for wavelengths within the band including $\lambda_1$, and a second intensity pattern for wavelengths within the band including $\lambda_2$. As described above, the first and second intensity patterns may be different $\phi(\lambda_1) \neq \phi(\lambda_2)$ or the same $\phi(\lambda_1) = \phi(\lambda_2)$.

In a manner described previously with respect to the photonic device 100, 200, the light intensity profiles emitted from the MWDOE may be reflected by a suitable object within the profile and return to the dual chromatic source photonic device 300. The dual chromatic source photonic device 300 further comprises a collector lens 305. The collector lens 305 may be configured such that light reflected from the object and incident on the collector lens is focused onto a return array 307. The collector lens as described previously may be a lens placed above the sensor array to direct light onto the sensor array that would otherwise miss the sensor. In some embodiments the collector lens 305 is a refractive lens.

In some embodiments, the collector lens is a MWDOE. The MWDOE is located above the return array and configured to interact with the light wavelengths reflected from the object. In some embodiments, the MWDOE collector lens forms different light intensity profiles or patterns, and thus focuses different wavelengths onto different positions or locations or portions of the return array. For example, the MWDOE collector lens when illuminated by the two light sources reflected from the object may be configured to generate discrete images to be formed on the return array, each from the respective discrete wavelengths.

In some embodiments, the MWDOE collector lens forms common light intensity profiles or patterns. In other words, the MWDOE collector lens, when illuminated by the light reflected from the object, produces the same intensity illumination profile for both wavelengths and thus is configured to focus the reflected light at the same or similar parts of the return array 307.

The dual chromatic source photonic device 300 further comprises the return array 307. The return array 307 may be a SPAD array such as implemented within the single source photonic device 100 shown in FIGS. 1 and 2.

Figure 4:
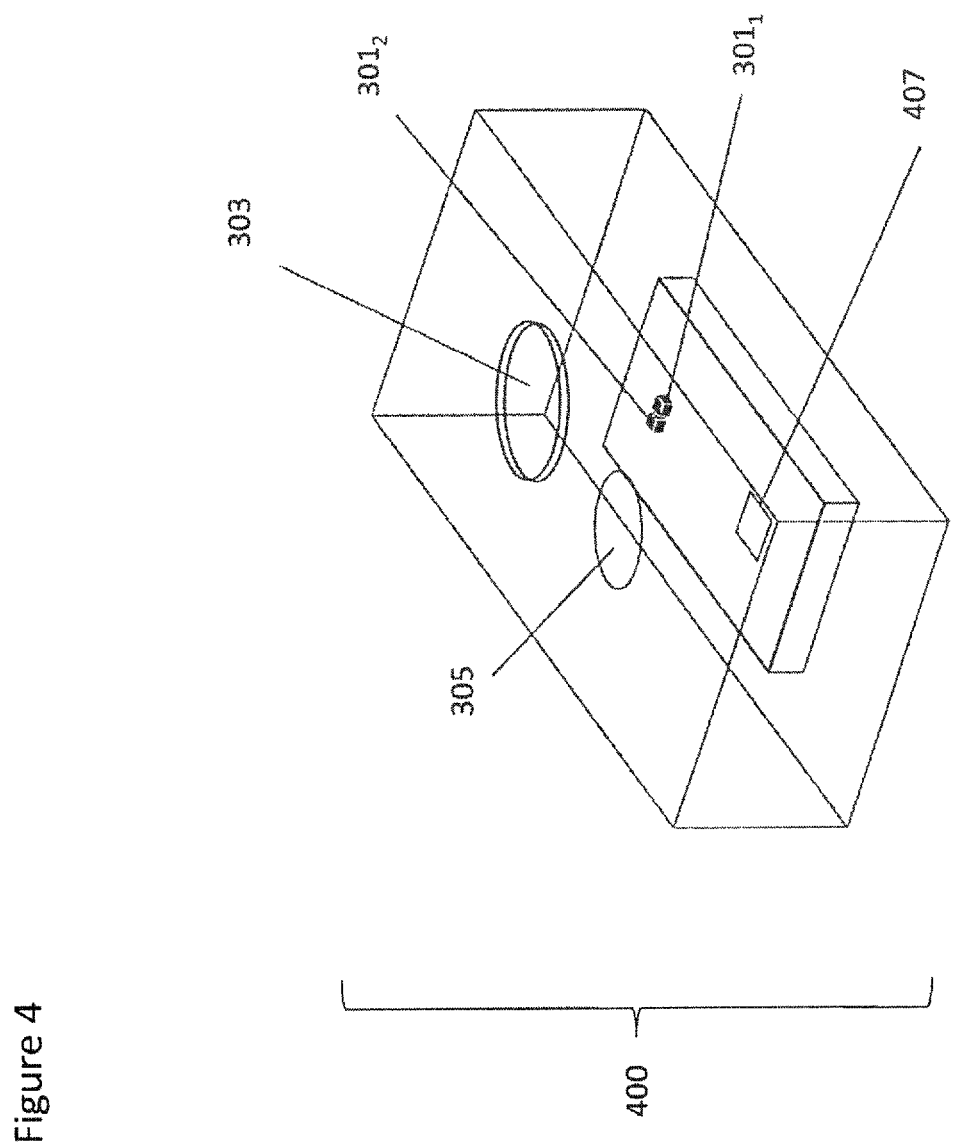
FIG. 4 is a schematic diagram of an example of a dual chromatic source photonic device with a filtered return array, according to the present disclosure.

Referring to FIG. 4, another embodiment of the dual chromatic source photonic device is shown wherein the return array is a filtered return array 407. The filtered return array 407 may be formed from a patterned filter array applied onto or over the SPAD array. The patterned filter array may be formed by multiple electromagnetic wavelength dependent band pass filters separated spatially. The band pass filters are tuned to pass either wavelength $\lambda_1$ or $\lambda_2$.

Alternatively, the filtered return array 407 may be formed from a dual band pass filter applied onto or over the SPAD array. The dual band pass filter is tuned to the wavelengths $\lambda_1$ and $\lambda_2$. In some embodiments, the filter may be a two part filter with a first low pass filter part configured to pass the lower of wavelengths $\lambda_1$ and $\lambda_2$, and a second high pass filter part configured to pass the higher of wavelengths $\lambda_1$ and $\lambda_2$.

In some embodiments, the filter is an interference filter. However, in some embodiments, the filter may be an absorption filter or a hybrid interference and absorption filter. In some embodiments, the patterned filter array may be implemented as a filter at the pixel level. In implementing a filter before the return array, it may be possible to infer or determine information based on the reflected signal from the two different wavelengths at the same time.

Figure 5:
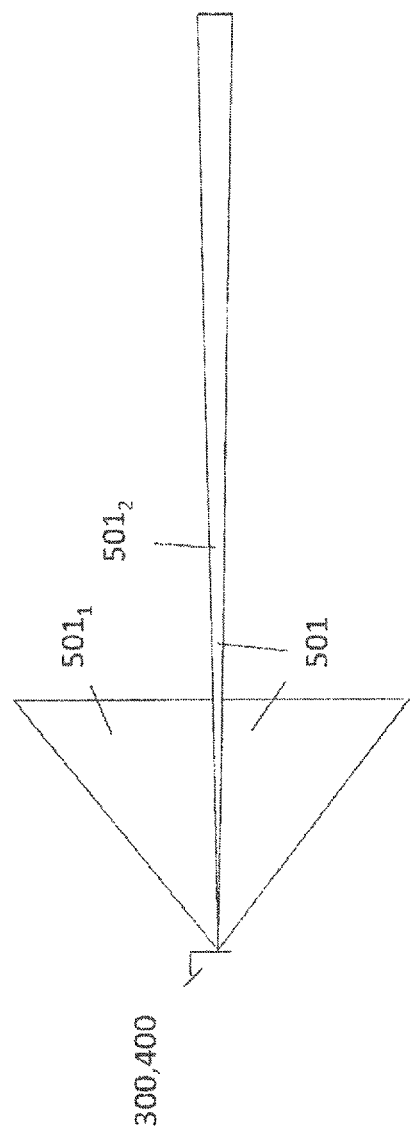
FIG. 5 is a schematic diagram of an example intensity profile of the dual chromatic source photonic devices from FIGS. 3 and 4.

Referring now to FIG. 5, cross-section profiles are shown for two wavelengths (or frequency bands) generated by the dual chromatic source photonic device shown in FIGS. 3 and 4. In this example, there is shown a dual chromatic source photonic device 300, 400 configured to generate the intensity profile associated with $\lambda_1$, given by $\phi(\lambda_1)$ $501_1$, the intensity profile associated with $\lambda_2$, given by $\phi(\lambda_2)$ $501_2$ and the combination of both output intensity profile $\phi(\lambda_1)+\phi(\lambda_2)$ 501. As such, the photonic device 300, 400 may be implemented within applications enabling the device to be used in a flexible range of circumstances. For example, in embodiments where the MWDOE generates different intensity profiles for the different wavelengths and thus may generate intensity profiles shown in FIG. 5, the device may be employed in applications enabling both near and far field object detection and in zone based detection for a wide range of distances from the device. In embodiments where the MWDOE generates similar intensity profiles for the different wavelengths, the device may be employed in applications where dual band illumination is required. For example, such a device may be employed in medical or scientific applications configured to determine or measure wavelength dependent features.

Figure 6:
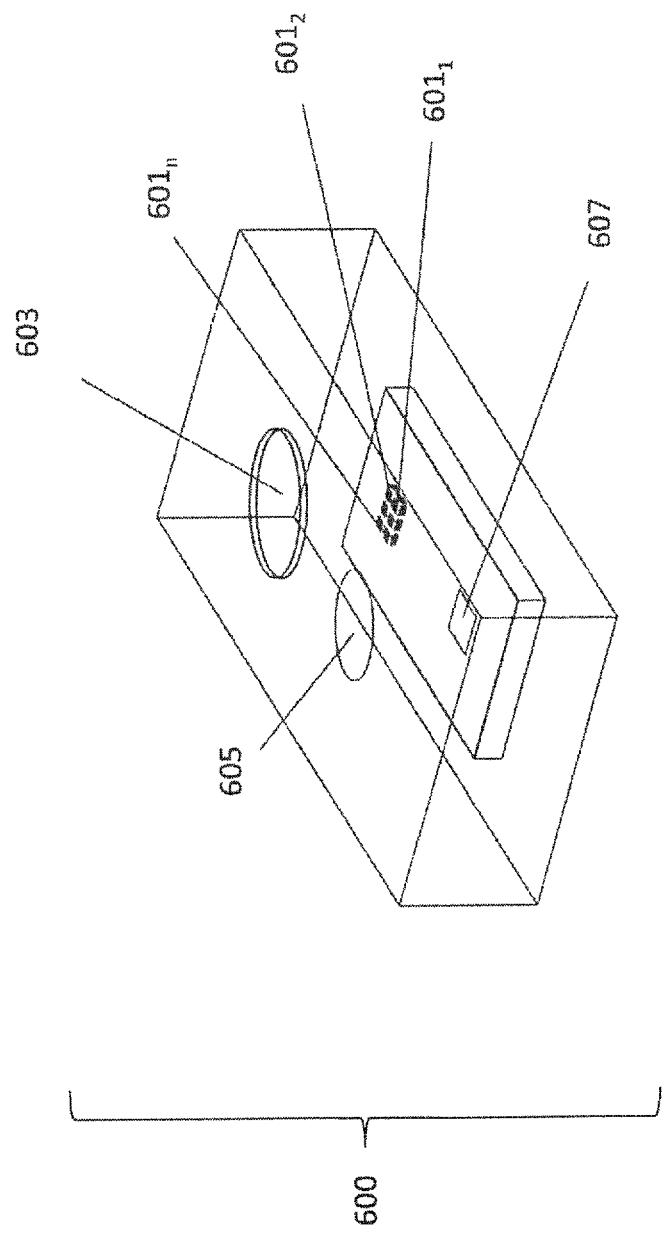
FIG. 6 is a schematic diagram showing an example of a multi-chromatic source photonic device, according to the present disclosure.

Referring to FIG. 6, an extension to the photonic device 300, 400 examples shown in FIGS. 3 and 4 is shown. The multi-chromatic source photonic device 600 shown in FIG. 6 shows a photonic device where the light source is an array of light source elements. The array of light source elements is shown in FIG. 6 as a 2×3 array of light source elements. However, the multi-chromatic source photonic device may be configured with any suitable light source element distribution. In some embodiments, each light source element is configured to generate a different and discrete light source wavelength (or discrete range of wavelengths). For example, FIG. 6 shows a light source comprising a first light source element $601_1$ configured to generate a wavelength $\lambda_1$, a second light source element $601_2$ configured to generate a wavelength $\lambda_2$ and a n'th light source element $601_n$ configured to generate a wavelength $\lambda_n$. In some embodiments, the solid state device may comprise a multi-Wavelength Vertical-Cavity Surface-Emitting Laser Array configured to generate a light source with multiple emission wavelengths $\lambda_1$, $\lambda_2, \ldots, \lambda_n$.

Furthermore, the multi-chromatic source photonic device 600 may comprise a MWDOE 603. In some embodiments, the MWDOE 303 forms different light intensity profiles or patterns. For example, the MWDOE 603, when illuminated by the light sources (or the single light source configured to generate the multiple emission wavelengths), produces different intensity profiles (or energy per solid angle patterns). Each wavelength is operated on by the MWDOE so that the output intensity profile for each wavelength is arbitrary and individual from other wavelength intensity patterns. The available intensity patterns that the device can use are the individual intensity patterns associated with $\lambda_1$, given by $\phi(\lambda_1)$, $\lambda_2$, given by $\phi(\lambda_2)$ and so on $\lambda_n$, given by $\phi(\lambda_n)$ and the combinations the individual output intensities e.g. $\phi(\lambda_1)+\phi(\lambda_2)$.

In some embodiments, the MWDOE may be designed such that it is configured to generate the same intensity profile for a broad range of emitter wavelengths. In such embodiments, the MWDOE 603 forms at least one common light intensity profile or pattern. For example, the MWDOE 603, when illuminated by the multiple light sources (or the single light source configured to generate the multiple emission wavelengths), produces the same intensity illumination profile for two wavelengths, for example, the intensity pattern associated with $\lambda_1$, given by $\phi(\lambda_1)$ and the intensity pattern associated with $\lambda_2$, given by $\phi(\lambda_2)$ where $\phi(\lambda_1)=\phi(\lambda_2)$.

Similarly, as described previously, as diffractive optics are very wavelength dependent, the MWDOE may be designed such that it is configured to generate the same intensity profile for a broad range of emitter wavelengths. In other words, the MWDOE may be designed to generate a first intensity pattern for wavelengths within the band including $\lambda_1$, a second intensity pattern for wavelengths within the band including $\lambda_2$, and so on up to an n'th intensity pattern for wavelengths within the band including $\lambda_n$.

The multi-chromatic source photonic device 600 further comprises a collector lens 605 configured such that light reflected from the object incident on the collector lens is focused onto the return array 607. In some embodiments, the collector lens 605 is a refractive lens.

In some embodiments, the collector lens 605 is a MWDOE. The MWDOE may be located above the return array and configured to interact with the light wavelengths reflected from the object. In some embodiments, the MWDOE collector lens forms different light intensity profiles or patterns and thus focuses different wavelengths onto different positions or locations (or discrete portions) of the return array. For example, the MWDOE collector lens, when illuminated by the multiple light sources reflected from the object, may be configured to generate discrete images to be formed on the return array, each from the respective discrete wavelengths. These images can thus be processed separately.

In some embodiments, the MWDOE collector lens forms common light intensity profiles or patterns. In other words, the MWDOE collector lens, when illuminated by the light reflected from the object, produces the same intensity illumination profile for at least two of the wavelengths and thus is configured to focus some of the reflected light wavelengths at the same or similar parts of the return array 607.

Figure 7:
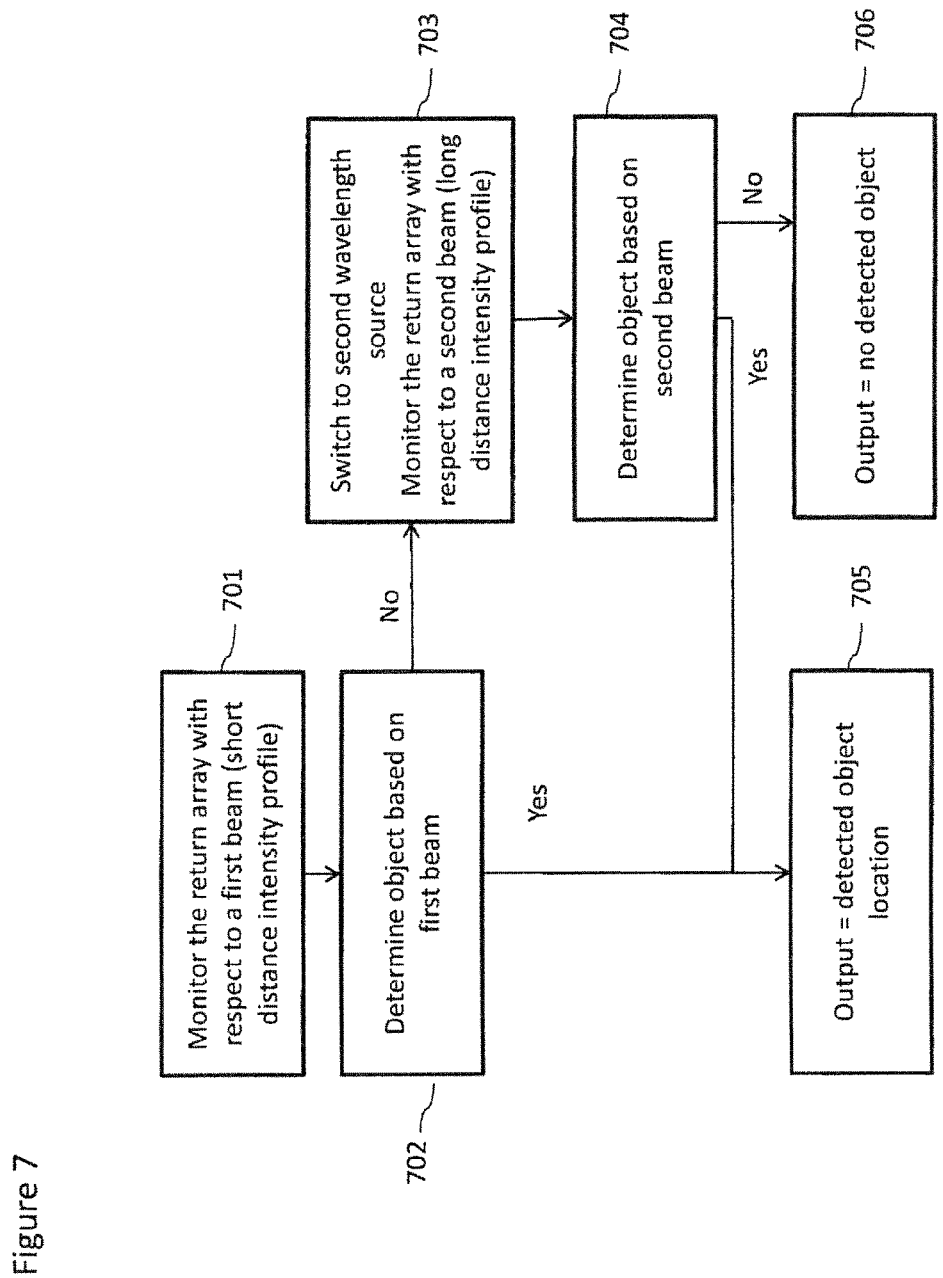
FIG. 7 is a flowchart depicting the method steps associated with an embodiment of the photonic device, according to the present disclosure.

The multi-chromatic source photonic device 600 may further comprise a return array 607. The return array 607 may be a SPAD array. Furthermore, in some embodiments, the return array may comprise a filtered return array configured to enable multiple wavelengths of light to be detected separately at the same time. In such a manner, a multi-chromatic source photonic device 600 may be employed in multiple applications. Furthermore, such a device may be employed in multiple applications at the same time (or substantially simultaneously). As such, the use of such devices prevents the need for multiple devices to be used with the associated application space or volume advantages. Furthermore, the device may be used in applications other than ranging. For example, it may be possible to measure the relative reflectance and path length for different wavelengths in a physical system. Furthermore, in embodiments where the MWDOE generates similar intensity profiles for different wavelengths the device may be employed in applications where dual or multiple band illumination is required. For example, such a device may be employed in medical or scientific applications configured to determine or measure wavelength dependent features. An example application of such devices as described herein is shown in FIG. 7. In the example, the application described with respect to the flow diagram of FIG. 7 the device is configured to detect objects over a wide range of distances.

In some embodiments, the photonic device is configured to monitor the return array with respect to a first beam (for a first wavelength source which from the MWDOE generates a "short distance" intensity profile). The device is furthermore configured to output the return array output to a processor. The operation of monitoring the return array with respect to a first "short distance" intensity profile is shown in FIG. 7 by step 701.

The photonic device, and in some embodiments the processor, may furthermore determine any objects within the profile defined by a first wavelength profile based on the return array output. The operation of determining an object based on the first beam is shown in FIG. 7 by step 702.

Where the object is determined, the distance may be determined or estimated. For example, the first wavelength profile may be near sensor for detecting the "head" of a user and thus preventing the user accidentally ending a call on a mobile phone. The device in some embodiments may furthermore determine when no object was determined or detected. When no object is determined, the processor may be configured to control the driver to switch a second wavelength light source on and switch the first wavelength source off.

The photonic device is configured to monitor the return array with respect to a second beam (for the second wavelength source which from the MWDOE generates a "far distance" intensity profile). The device is furthermore configured to output the return array output to a processor. The operation of switching to a second wavelength source and monitoring the return array with respect to the second "far distance" intensity profile is shown in FIG. 7 by step 703.

The photonic device, and in some embodiments the processor, may furthermore determine any objects within the profile defined by the second wavelength profile based on the return array output. For example, the second wavelength profile may be a far sensor for detecting objects for "autofocus front facing or selfie" cameras mounted on the mobile phone.

The operation of determining an object based on the second beam is shown in FIG. 7 by step 704. The device, in some embodiments, may furthermore determine when no object was determined or detected using the second wavelength source. When no object is determined, the processor may be configured to output an indicator that there is no detected objects in range of the sensor. The outputting an indicator that there are no detected objects is shown in FIG. 7 by step 706.

In some embodiments where an object is determined or detected using either, the first or second wavelength source may be configured to output an indicator that an object has been detected and furthermore the location of the object. The outputting of an indicator that an object has been detected and furthermore the location of the object is shown in FIG. 7 by step 705.

It will be appreciated that while the example shown in FIG. 2 shows only one object, the dual or multi-chromatic source photonic device may be used to detect multiple or further objects. It will be appreciated that embodiments of the disclosure may be implemented in a wide variety of applications. For example, ranging data extracted from the return and reference peak subtraction according to embodiments could be used for a large number of applications including user detection, auto-focus assist and machine vision. In the foregoing a photonic device 300, 400, 600 is described which may be part of a mobile phone, for example, part of a touch screen on a mobile phone or other device. It will be appreciated however that the photonic device may be incorporated in any suitable apparatus.

That which is claimed is:

1. A method comprising:
generating, within a device comprising a single solid state housing, a plurality of separate and discrete wavelengths from a plurality of light sources disposed within the single solid state housing;
generating a plurality of light intensity profiles based on an interaction between the plurality of separate and discrete wavelengths and a multi-wavelength diffractive optic element that is disposed within the single solid state housing;
collecting reflected light, using a collector lens that is disposed within the single solid state housing, the reflected light being from at least one of the plurality of light intensity profiles reflected off an object;
filtering the collected reflected light with a band pass filter that is disposed within the single solid state housing; and
detecting the object, at a processor disposed within the single solid state housing, from the filtered light using the plurality of light intensity profiles;
the plurality of light intensity profiles comprising a shorter range light intensity profile and a longer range light intensity profile, the plurality of light intensity profiles being centered along a same direction, each light intensity profile being different in range.

2. The method as in claim 1 wherein the plurality of light intensity profiles is spatially different.

3. The method as in claim 1 further comprising detecting the collected reflected light using a return array.

4. The method as in claim 3 wherein because of the filtering, the return array independently detects a first wavelength of the plurality of separate and discrete wavelengths from a second wavelength of the plurality of separate and discrete wavelengths.

5. The method as in claim 3 further comprising:
determining a time of flight estimate from the collected reflected light using the return array; and
determining a distance between the device and the object based on the time of flight estimate from the collected reflected light using the return array.

6. The method as in claim 3 further comprising:
determining a phase difference between the collected reflected light using the return array and a reference signal; and
determining a distance between the device and the object based on the phase difference.

7. The method as in claim 1 wherein generating the plurality of separate and discrete wavelengths comprises generating each of the plurality of separate and discrete wavelengths respectively using separate light emitting diodes.

8. The method as in claim 1 wherein generating the plurality of separate and discrete wavelengths comprises generating each of the plurality of separate and discrete wavelengths using a single laser diode.

9. A photonic device comprising:
a solid state housing;
a light source disposed in the solid state housing and configured to generate a plurality of separate and discrete wavelengths; and
a multi-wavelength diffractive optic element disposed in the solid state housing and configured to generate a plurality of light intensity profiles based on an interaction with the plurality of separate and discrete wavelengths,
the plurality of light intensity profiles comprising a shorter range light intensity profile and a longer range light intensity profile, the plurality of light intensity profiles being centered along a same direction, each light intensity profile being different in range; and
a return array disposed in the solid state housing and comprising a single-photon avalanche diode (SPAD) array that is configured to detect light from the plurality of light intensity profiles reflected from an object; and
a processor disposed in the solid state housing and configured to detect the object from light detected at the return array.

10. The photonic device as in claim 9 wherein the plurality of light intensity profiles is spatially different.

11. The photonic device as in claim 9 further comprising a collector lens configured to collect reflected light, the reflected light being from at least one light intensity profile of the plurality of light intensity profiles reflected off the object.

12. The photonic device as in claim 11 wherein the collector lens comprises a multi-wavelength diffractive optic element configured to focus a first wavelength of the plurality of separate and discrete wavelengths on a first portion of the return array and a second wavelength of the plurality of separate and discrete wavelengths on a second portion of the return array; and wherein the first portion of the return array is separate from the second portion of the return array.

13. The photonic device as in claim 11 further comprising a patterned filter array configured to filter the collected reflected light so that the return array independently detects a first wavelength of the plurality of separate and discrete wavelengths from a second wavelength of the plurality of separate and discrete wavelengths.

14. The photonic device as in claim 11 wherein the processor is configured to:
 determine a time of flight estimate from the collected reflected light using the return array; and
 determine a distance to the object based on the time of flight estimate from the collected reflected light using the return array.

15. The photonic device as in claim 11 wherein the processor is configured to:
 determine a phase difference between the collected reflected light using the return array and a reference signal; and
 determine a distance to the object based on the phase difference.

16. The photonic device as in claim 9 wherein the light source comprises a plurality of light emitting diodes; and wherein each of the plurality of light emitting diodes is configured to generate a respective separate and discrete wavelength.

17. The photonic device as in claim 9 wherein the light source comprises a laser diode; and wherein the laser diode is configured to generate the plurality of separate and discrete wavelengths.

18. The photonic device as in claim 17 wherein the laser diode comprises a multi-wavelength vertical-cavity surface-emitting laser.

19. A ranging device comprising:
 a solid state housing;
 a light source disposed in the solid state housing and configured to generate a plurality of separate and discrete wavelengths, wherein the light source is a single solid state device having emission at multiple wavelengths so as to generate the plurality of separate and discrete wavelengths;
 a multi-wavelength diffractive optic element disposed in the solid state housing and configured to generate a plurality of light intensity profiles based on an interaction with the plurality of separate and discrete wavelengths;
 a collector optical element disposed in the solid state housing and to collect reflected light, the reflected light being from at least one light intensity profile of the plurality of light intensity profiles reflected off an object;
 the plurality of light intensity profiles comprising a shorter range light intensity profile and a longer range light intensity profile, the plurality of light intensity profiles being centered along a same direction, each light intensity profile being different in range;
 a return array disposed in the solid state housing and configured to detect the collected reflected light, the return array comprising a single-photon avalanche diode (SPAD) array; and
 a processor disposed in the solid state housing and configured to detect the object based on an output from the return array.

20. The ranging device as in claim 19 wherein the plurality of light intensity profiles is spatially different.

21. The ranging device as in claim 19 wherein the collector optical element comprises a multi-wavelength diffractive optic element configured to focus a first wavelength of the plurality of separate and discrete wavelengths on a first portion of the return array and a second wavelength of the plurality of separate and discrete wavelengths on a second portion of the return array; and wherein the first portion of the return array is separate from the second portion of the return array.

* * * * *